(No Model.)
J. S. BRETZ.
WHEEL.
No. 457,861. Patented Aug. 18, 1891.
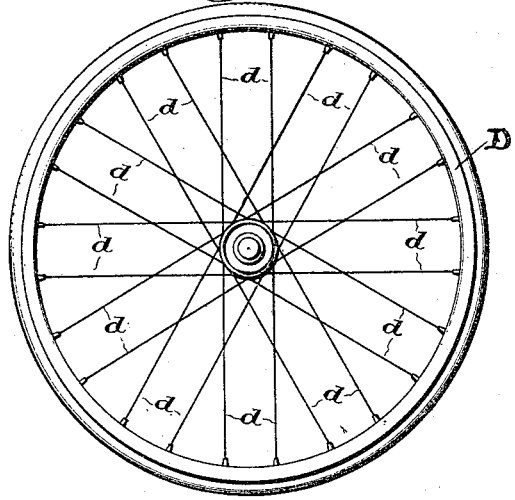
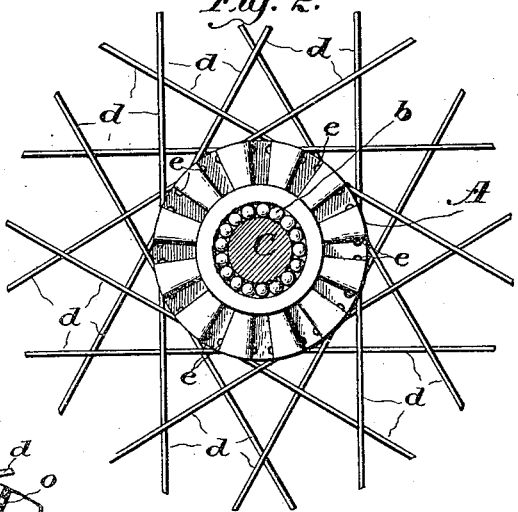
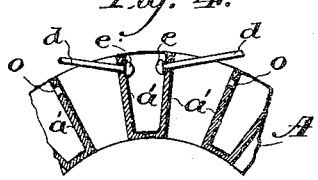
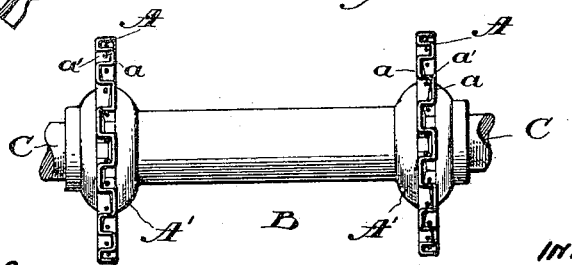
WITNESSES:
INVENTOR:
Jacob S. Bretz.

UNITED STATES PATENT OFFICE.

JACOB S. BRETZ, OF PHILADELPHIA, PENNSYLVANIA.

WHEEL.

SPECIFICATION forming part of Letters Patent No. 457,861, dated August 18, 1891.

Application filed May 12, 1891. Serial No. 392,460. (No model.)

*To all whom it may concern:*

Be it known that I, JACOB S. BRETZ, of the city of Philadelphia, and State of Pennsylvania, have invented a certain new and useful Improvement in Wheels for Bicycles, Velocipedes, and other Vehicles; and I do hereby declare the following to be a full, clear, and exact description thereof, reference being had to the accompanying drawings, forming part of this specification.

My invention has relation to wheels for bicycles, velocipedes, and other vehicles; and it consists in the device hereinafter particularly described and claimed.

The object of my invention is to obviate and overcome the angular strain on the spoke at the point of juncture with the hub in wheels having wire or metal tangential spokes and to enable the spokes to be secured to the hub without bending or twisting, and, further, to provide strength of construction in such wheels.

In the accompanying drawings similar letters of reference refer to similar parts throughout.

Figure 1 is a side elevation of the tangentially-spoked wheel. Fig. 2 is an enlarged detail view showing the tangential spokes as secured to the flange of the hub. Fig. 3 represents the flanges of the hub with the spokes detached. Fig. 4 is an enlarged sectional view showing in detail the tangential spokes as secured to the flange of the hub.

A is an angular flange having the angles $a$ $a'$, which is rigidly secured to the hub B through the medium of the shoulder A'. The combined flange and hub usually consists of two flanges rigidly secured together to the horizontal sleeve or hub B, as shown in Fig. 3. To each of said flanges is secured a series of wire spokes, which converge to a central line at the rim D and are secured thereto by any suitable means. The flange A is preferably constructed with the angles $a$ $a'$, as shown in the drawings, the alternate sides of the flange in the construction shown, as in Fig. 4, being open to allow of the spoke or rod to be threaded or inserted and secured thereto. An orifice $o$ is provided in each of the cross-flanges $a'$, through which the rod or spoke $d$ is passed at an angle to the line of the flange $a'$. A head or rivet $e$ is, in the preferable construction, provided on the hub end of each spoke, which secures it firmly in position to the hub, the other end of the spoke being screwed or otherwise secured by any suitable means into the rim D. The spoke $d$ may be secured to the flange A by other means than the employment of the head $e$—as, for instance, the hub end of the spoke may be secured to the flange A by a screw-thread and nut or by other suitable means.

C is the axle, and $b$ represent ball-bearings.

In my invention described it will be seen that by reason of the construction described at the point of juncture of the tangential spoke and hub the spokes are secured to the hub without bending or twisting, and in this sense all strain at that point is direct, and the angular strain incident to constructions of such general class of tangentially-constructed wheels heretofore invented is obviated.

As will be seen from the construction described of the heads or rivets $e$, provided on the inner ends of the spokes, the hub is made rigid with the rim of the wheel by screwing the rim of the spokes tightly to the rim of the wheel by the tension device there employed, when all the spokes are properly adjusted. A single spoke secures the hub to the rim in a single direction; but in the completed construction of the wheel the multiplicity of spokes gives rigidity and strength, the tension in the opposite and other directions by the other spokes giving the strength and rigidity to the whole. Each spoke in the construction of the wheel is readily and easily passed through the orifice $o$, provided in the flange A without bending or turning, and it is then in position in the hub to be screwed or otherwise secured rigidly into the rim of the wheel at its outer end.

Although I have shown and described particular preferable shape of flange, I do not limit myself to this particular form of construction, as others may be employed in carrying out my invention.

I am aware that devices have been heretofore constructed to overcome the angular strain produced on the spoke at the point of juncture with the hub, and do not claim such constructions, broadly. Many of these are complicated and intricate, consisting of numerous parts, expensive to manufacture, liable to get out of order, and frequently fail in accomplishing the object to be effected.

Having thus described my invention, what I claim, and desire to secure by Letters Patent, is—

1. In a vehicle-wheel, a hub or sleeve, circumferential plates or flanges provided at or near each end of the hub, composed of radiating flanges, each radiating flange having its face at right angles to its adjoining flanges, orifices provided in the cross-flanges, which are parallel with the axis of the hub, and spokes adjusted tangentially through said orifices and secured to its flange by a head or rivet provided on the inner end of said spoke in contact with the face of the flange to which it is secured, the outer end of each spoke secured to the rim of the wheel, substantially as described.

2. In a vehicle-wheel, flange or flanges A, rigidly secured to the hub B, said flange A provided with the securing angles or flanges $a\ a'$, and orifices $o$, provided therein, spokes $d$, adjusted tangentially to the flange, secured through the said orifices $o$, head or rivet $e$, provided on the inner end of the spoke $d$, and rim D, to which the outer ends of the spoke $d$ are secured, substantially as described.

3. In a vehicle-wheel, flanges A, hub B, to which said flanges are rigidly secured through the medium of the shoulders A', angular faces $a\ a'$, provided upon the flanges A, metal spokes $d$, secured to said flanges through orifices provided in the flange A, head $e$, provided on the inner end of the spoke $d$, securing said spoke to the flange A by contact with one of the faces of the flange, and rim D, to which the outer ends of the spokes are firmly secured, substantially as described.

In witness whereof I have hereunto set my hand this 8th day of May, A. D. 1891.

JACOB S. BRETZ.

Witnesses:
WILLIAM M. STEWART, Jr.,
HORACE PETTIT.